(12) United States Patent
Ko (10) Patent No.: US 12,535,134 B2
(45) Date of Patent: Jan. 27, 2026

(54) PARKING LOCK ACTUATOR FOR VEHICLE EQUIPPED WITH ELECTRONIC STOPPER FOR SHOCK PREVENTION

(71) Applicant: Futronic Co., Ltd., Busan (KR)

(72) Inventor: Jinho Ko, Busan (KR)

(73) Assignee: Futronic Co., Ltd., Busan (KR)

( * ) Notice: Subject to any disclaimer, the term of this patent is extended or adjusted under 35 U.S.C. 154(b) by 0 days.

(21) Appl. No.: 18/764,137

(22) Filed: Jul. 3, 2024

(65) Prior Publication Data
US 2025/0389329 A1    Dec. 25, 2025

(30) Foreign Application Priority Data
Jun. 19, 2024   (KR) ........................ 10-2024-0079726

(51) Int. Cl.
*F16H 63/34*   (2006.01)
(52) U.S. Cl.
CPC ..... *F16H 63/3466* (2013.01); *F16H 63/3433* (2013.01)
(58) Field of Classification Search
CPC ...... F16D 63/34–34/3491; B60T 1/005; B60T 1/062
See application file for complete search history.

(56) References Cited

U.S. PATENT DOCUMENTS

2019/0136974 A1*   5/2019   Li ........................ F16H 57/039

FOREIGN PATENT DOCUMENTS

| CN | 110778712 A | * | 2/2020 | ......... F16H 63/3491 |
| JP | 2000085552 A | * | 3/2000 | ......... F16H 63/3466 |

* cited by examiner

*Primary Examiner* — Richard M Lorence
(74) *Attorney, Agent, or Firm* — United One Law Group LLC; Kongsik Kim; Jhongwoo Peck (57) ABSTRACT

A parking lock actuator for a vehicle equipped with an electronic stopper for shock prevention includes a printed circuit board provided with a controller; a rotating shaft gear-engaged with the movable member, and configured to convert the linear movement of the movable member into rotational movement; a fixing bracket screwed to one side of the rear of the rotating shaft, and configured to be rotated by the rotating shaft; a magnet fixedly coupled to the lower end of the fixing bracket, and configured to be rotated by the fixing bracket and generate magnetic force; and a Hall sensor provided on the top surface of the printed circuit board to face the magnet, and configured to detect the magnetic force of the magnet when the magnet is rotated.

6 Claims, 13 Drawing Sheets

PARKING LOCK ACTUATOR FOR VEHICLE EQUIPPED WITH ELECTRONIC STOPPER FOR SHOCK PREVENTION

CROSS-REFERENCE TO RELATED APPLICATION

This application claims priority from Korean Application No. 10-2024-0079726 filed on Jun. 19, 2024, which is incorporated herein by reference in its entirety.

BACKGROUND

1. Technical Field

The present invention relates generally to a parking lock actuator for a vehicle equipped with an electronic stopper for shock prevention, and more particularly to a parking lock actuator for a vehicle equipped with an electronic stopper for shock prevention, in which, when the magnetic force of a magnet detected by a Hall sensor is equal to a reference value, a drive motor that drives a movable member and a rotating shaft may be stopped using the magnet rotated by the rotating shaft and the Hall sensor configured to detect the magnetic force of the magnet, so that the movable member can be prevented from colliding with the side wall of a guide support body in advance.

2. Description of the Related Art

A parking lock actuator refers to a device used in a parking lock apparatus that stops the operation of a drive train, such as the transmission or reducer of a vehicle, to prevent the vehicle from moving when the vehicle is parked on an inclined road.

The parking lock apparatus includes a parking latch configured to engage with the parking lock gear of a transmission or reducer, and a parking lock actuator configured to operate the parking latch.

When a vehicle switches from a driving state to a parking state, the parking latch is engaged with the parking lock gear by the operation of the parking lock actuator, thereby preventing the vehicle from moving when the vehicle is parked.

Furthermore, when the vehicle switches from a parking state to a driving state, the parking latch is moved to an unlocked position by the operation of the parking lock actuator, thus allowing the vehicle to drive.

Recently, as electric vehicles have become popular, electromechanical parking lock apparatuses that operate parking latches electromechanically have been mainly applied.

A conventional parking lock actuator includes a movable member configured to move linearly in the left-right directions, and a guide support body configured to guide the movable member through the linear movement thereof.

However, in the conventional parking lock actuator, a stopper configured to alleviate impact upon completion of the operation of the movable member is provided in a mechanical form or is not provided separately, so that there is a problem in that durability and lifespan may be reduced due to impact upon completion of the operation of the movable member.

PRIOR ART LITERATURE

Patent Document: Korean Patent Application Publication No. 10-2021-0047809

SUMMARY

The present invention has been conceived to overcome the above-described problems, and an object of the present invention is to provide a parking lock actuator for a vehicle equipped with an electronic stopper for shock prevention, in which, when the magnetic force of a magnet detected by a Hall sensor is equal to a reference value, a drive motor that drives a movable member and a rotating shaft may be stopped using the magnet rotated by the rotating shaft and the Hall sensor configured to detect the magnetic force of the magnet, so that there is the effect of preventing the movable member from colliding with the side wall of a guide support body in advance.

Furthermore, an object of the present invention is to provide a parking lock actuator for a vehicle equipped with an electronic stopper for shock prevention, when the movable member moves in a straight line and approaches the side wall of the guide support body, the movable member is prevented from colliding with the side wall through a stopper that is fixedly coupled to the side wall and has elastic force in advance, so that there is the effect of improving the stability of a vehicle when switching the vehicle to a parking state or a driving state.

According to an aspect of the present invention, there is provided a parking lock actuator for a vehicle equipped with an electronic stopper for shock prevention, including a drive motor, a reducer configured to reduce the output speed of the drive motor, a movable member configured to convert the rotational movement of the reducer into linear movement, and a guide unit configured to guide the movable member through the linear movement thereof, the parking lock actuator including: a printed circuit board provided with a controller to control the driving of the drive motor; a rotating shaft gear-engaged with the movable member, and configured to convert the linear movement of the movable member into rotational movement; a fixing bracket screwed to one side of the rear of the rotating shaft, and configured to be rotated by the rotating shaft; a magnet fixedly coupled to the lower end of the fixing bracket, and configured to be rotated by the fixing bracket and generate magnetic force; and a Hall sensor provided on the top surface of the printed circuit board to face the magnet, and configured to detect the magnetic force of the magnet when the magnet is rotated; wherein the controller, when the magnetic force detected by the Hall sensor is a preset reference magnetic force, controls the drive motor to stop such that the linear movement of the movable member can be stopped.

The guide unit may include a guide support body screwed to the other side of the reducer, and a guide shaft formed to pass through the guide support body, axially coupled to the reducer, and configured to be rotated by the reducer; the moving member may be screwed to the guide shaft, and may be moved linearly in the left-right directions by the guide shaft when the guide shaft is rotated; a fixing portion that is screwed to the reducer may be formed on one side of the guide support body; a first side wall may be formed on the other side of the fixing portion to stop the movable member from moving linearly in the left direction; a second side wall may be formed on the other side of the guide support body to stop the movable member from moving linearly in the right direction; and the guide unit may include a first stopper fixedly coupled to the other side of the first side wall to prevent the moving member from colliding with the first side wall, and a second stopper fixedly coupled to one side of the second side wall to prevent the movable member from colliding with the second side wall.

The first and second stoppers may each be formed in the shape of a disk having a predetermined thickness; and the first and second stoppers may each be made of any one of coated carbon tool steel, rubber, and polyurethane to absorb the impact force of the movable member when it collides with the movable member.

A first recessed hole into which the first stopper is partially inserted when the movable member moves in the left direction may be recessed into one side of the movable member; and a second recessed hole into which the second stopper is partially inserted when the movable member moves in the right direction may be recessed into the other side of the movable member.

The guide unit may further include an auxiliary shaft disposed in front of the guide shaft and in parallel to the guide shaft and configured to guide the movable member so that the movable member can move linearly in the left-right directions without rotating; a first through hole may be recessed into one side of the first stopper so that one side of the auxiliary shaft can be inserted therethrough; and a second through hole may be recessed into one side of the second stopper so that the other side of the auxiliary shaft can be inserted therethrough.

The parking lock actuator may further include a moving unit provided on the other side of the reducer and configured to convert the rotational movement of the reducer into linear movement; a third recessed hole having a concave and curved shape may be formed on one side of the movable unit; a fourth recessed hole having a concave and curved shape may be formed on the other side of the movable unit; the guide unit may further include a third stopper fixedly coupled to the other side of the first side wall and configured to be partially inserted into the third recessed hole to prevent the movable unit from colliding with the first side wall, and a fourth stopper fixedly coupled to one side of the second side wall and configured to be partially inserted into the fourth recessed hole to prevent the movable unit from colliding with the second side wall; the third stopper may be formed in a convex and curved shape; and the fourth stopper may be formed in a convex and curved shape.

In the parking lock actuator for a vehicle equipped with an electronic stopper for shock prevention according to an embodiment of the present invention, when the magnetic force of the magnet detected by the Hall sensor is equal to a reference value, the drive motor that drives the movable member and the rotating shaft may be stopped using the magnet rotated by the rotating shaft and the Hall sensor configured to detect the magnetic force of the magnet, so that there is the effect of preventing the movable member from colliding with the side wall of the guide support body in advance.

In the parking lock actuator for a vehicle equipped with an electronic stopper for shock prevention according to an embodiment of the present invention, when the movable member moves in a straight line and approaches the side wall of the guide support body, the movable member is prevented from colliding with the side wall through the stopper that is fixedly coupled to the side wall and has elastic force in advance, so that there is the effect of improving the stability of the vehicle when switching the vehicle to a parking state or a driving state.

In the parking lock actuator for a vehicle equipped with an electronic stopper for shock prevention according to an embodiment of the present invention, it may be possible to prevent the movable member from colliding with the guide support body in advance, so that there is the effect of dramatically increasing the durability and lifespan of the parking lock actuator.

BRIEF DESCRIPTION OF THE DRAWINGS

The above and other objects, features, and advantages of the present invention will be more clearly understood from the following detailed description taken in conjunction with the accompanying drawings, in which.

DETAILED DESCRIPTION

In order to describe the present invention in detail so that those having ordinary skill in the art to which the present invention pertains can easily practice the technical spirit of the present invention, embodiments of the present invention will be described below with reference to the accompanying drawings.

However, the following embodiments are merely examples intended to help understanding of the present invention, and the scope of the present invention is not reduced or limited thereby. Furthermore, the present invention may be implemented in many different forms and is not limited to the embodiments described herein.

Figure 1:
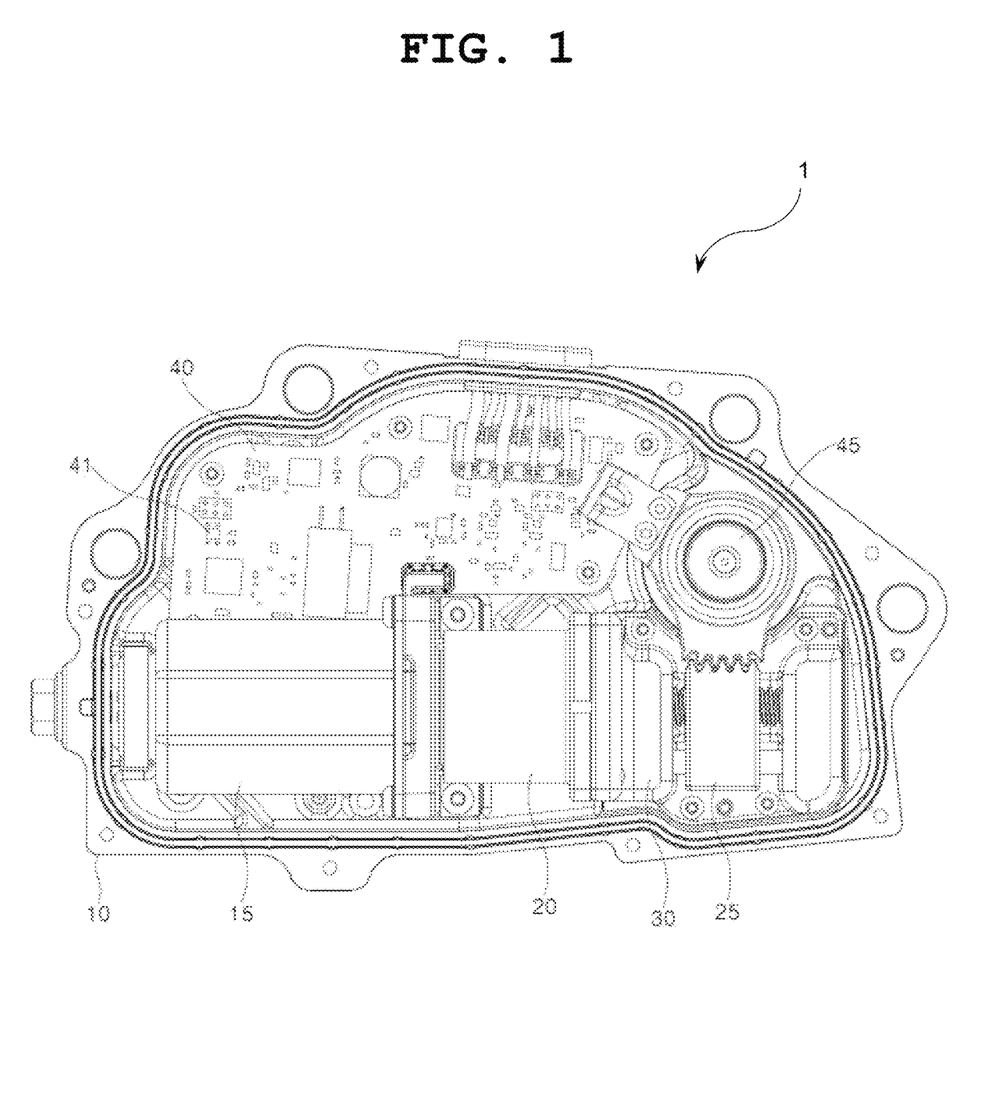
FIG. 1 is a plan view of a parking lock actuator for a vehicle equipped with an electronic stopper for shock prevention according to an embodiment of the present invention.

FIG. 1 is a plan view of a parking lock actuator 1 for a vehicle equipped with an electronic stopper for shock prevention according to an embodiment of the present invention. Referring to FIG. 1, the parking lock actuator 1 for a vehicle equipped with an electronic stopper for shock prevention according to the present embodiment includes a housing 10, a drive motor 15, a reducer 20, a movable member 25, a guide unit 30, and a printed circuit board (PCB) 40.

First, the housing 10 serves to protect the drive motor 15, the reducer 20, the movable member 25, the guide unit 30, and the PCB 40 in order to prevent foreign substances or water from entering the drive motor 15, the reducer 20, the movable member 25, the guide unit 30, and the PCB 40 disposed in the housing 10.

Furthermore, the drive motor 15 is provided inside the housing 10 and driven by electric power.

Furthermore, the reducer 20 is axially coupled to the drive motor 15 and reduces the output speed of the drive motor 15. More specifically, the reducer 20 may increase the output torque of the drive motor 15 by reducing the output speed of the drive motor 15. In this case, the reducer 20 may include a plurality of planetary gears.

Furthermore, the movable member 25 is provided on the other side of the reducer 20, and converts the rotational movement of the reducer 20 into linear movement. In this case, the drive motor 15, the reducer 20, and the movable member 25 are arranged on the same axial line.

Furthermore, the guide unit 30 is screwed to the other side of the reducer 20 and serves to guide the movable member 25 through the linear movement thereof.

Furthermore, the PCB 40 is provided with a controller 41 to control the operation of the drive motor 15.

Figure 2:
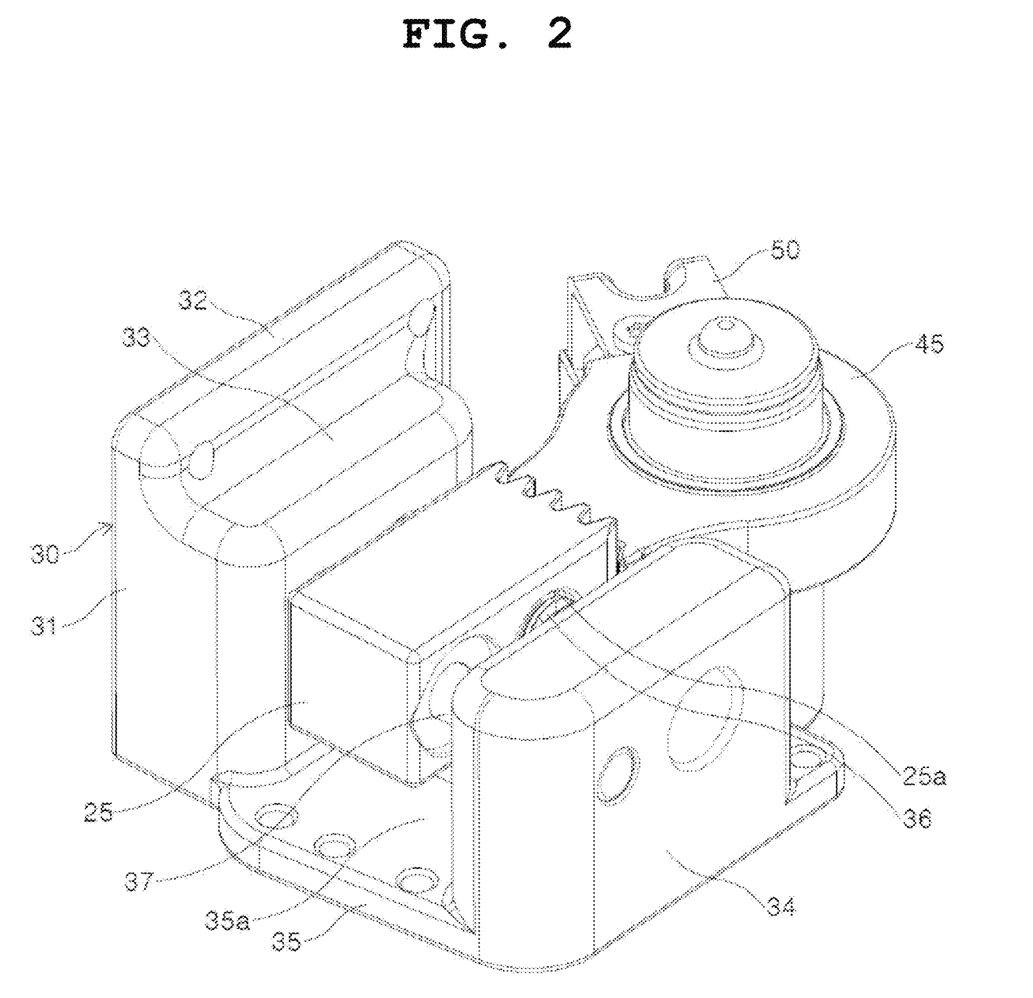
FIG. 2 is a perspective view of the movable member, guide unit, and rotating shaft shown in FIG. 1.

FIG. 2 is a perspective view of the movable member 25, guide unit 30, and rotating shaft 45 shown in FIG. 1. Referring to FIG. 2, the guide unit 30 includes a guide support body 31, a guide shaft 36, and an auxiliary shaft 37.

First, the guide support body 31 is screwed to the other side of the reducer 20.

Furthermore, the guide shaft 36 is formed to pass through the guide support body 31, is axially coupled to the reducer 20, and is rotated by the reducer 20. In this case, the guide shaft 36 is formed in the shape of a round rod in the left-right directions. In this case, a thread is formed on the outer peripheral surface of the guide shaft 36.

Furthermore, the auxiliary shaft 37 is disposed in front of the guide shaft 36 and in parallel to the guide shaft 36, and thus guides the movable member 25 so that the movable member 25 can move linearly in the left-right directions without rotating. In this case, the auxiliary shaft 37 is formed in the shape of a round rod in the left-right directions.

Meanwhile, the movable member 25 is screwed to the guide shaft 36, and is thus moved linearly in the left-right directions by the guide shaft 36 when the guide shaft 36 is rotated. In this case, a screw hole 25a that is screwed to the guide shaft 36 is formed through one side of the movable member 25.

Figure 3:
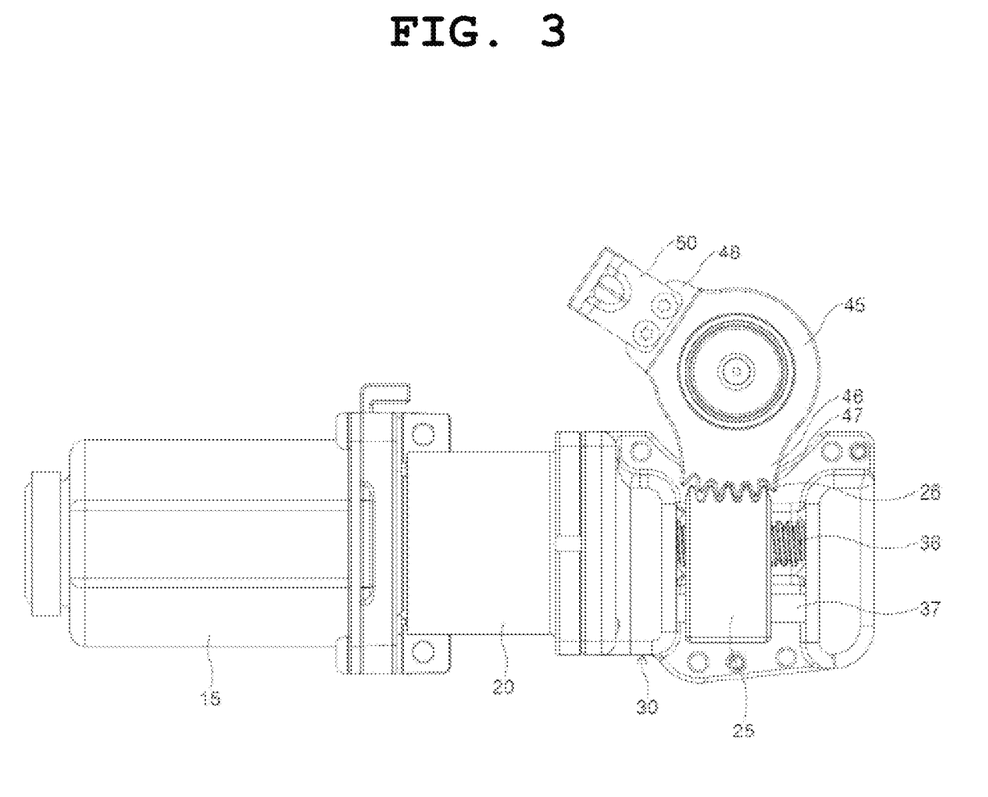
FIG. 3 is a plan view of a drive motor, a reducer, the movable member, the guide unit, and the rotating shaft.
Figure 4:
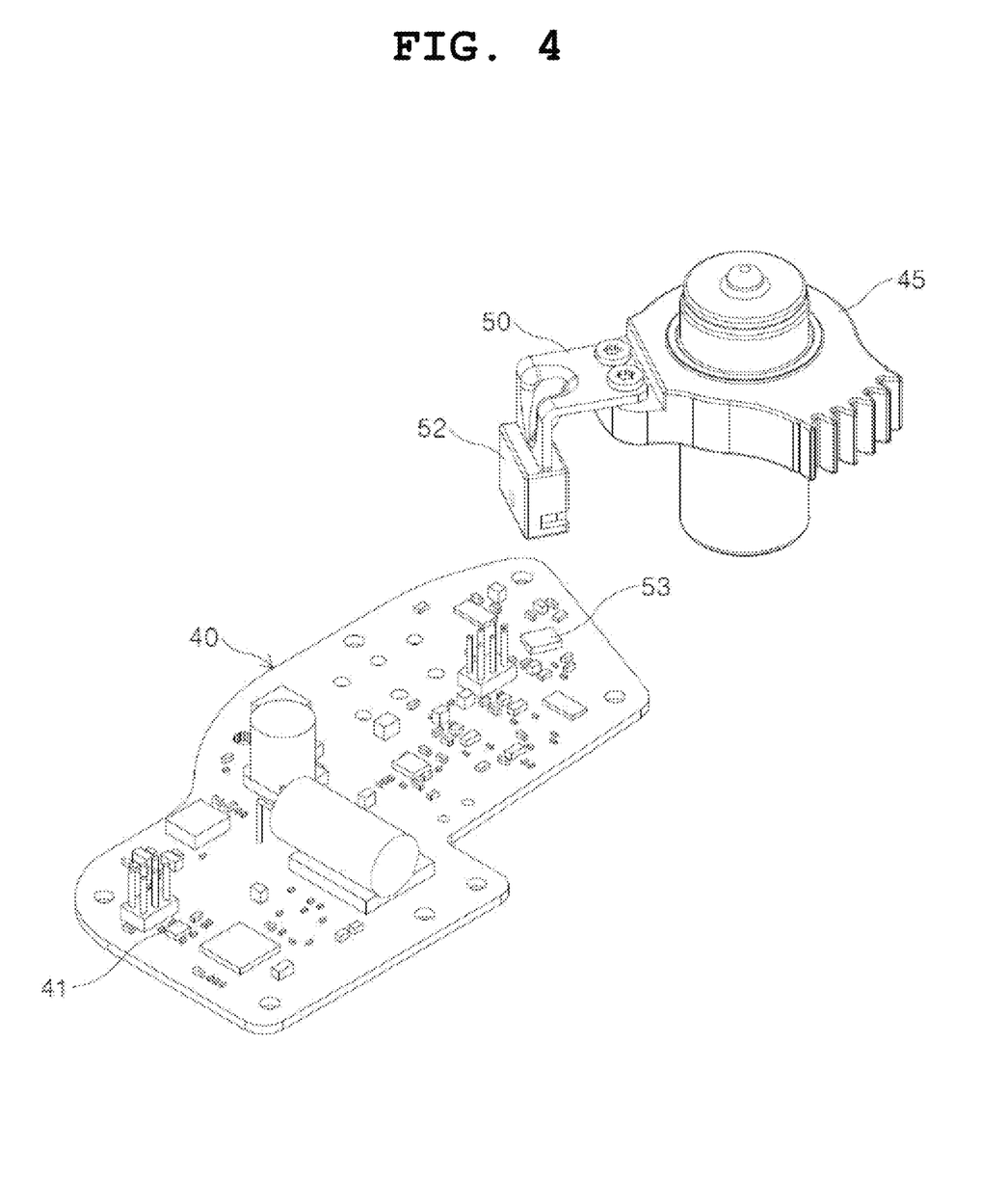
FIG. 4 is a perspective view of a printed circuit board, the rotating shaft, a fixing bracket, a molding part, and a Hall sensor.
Figure 5:
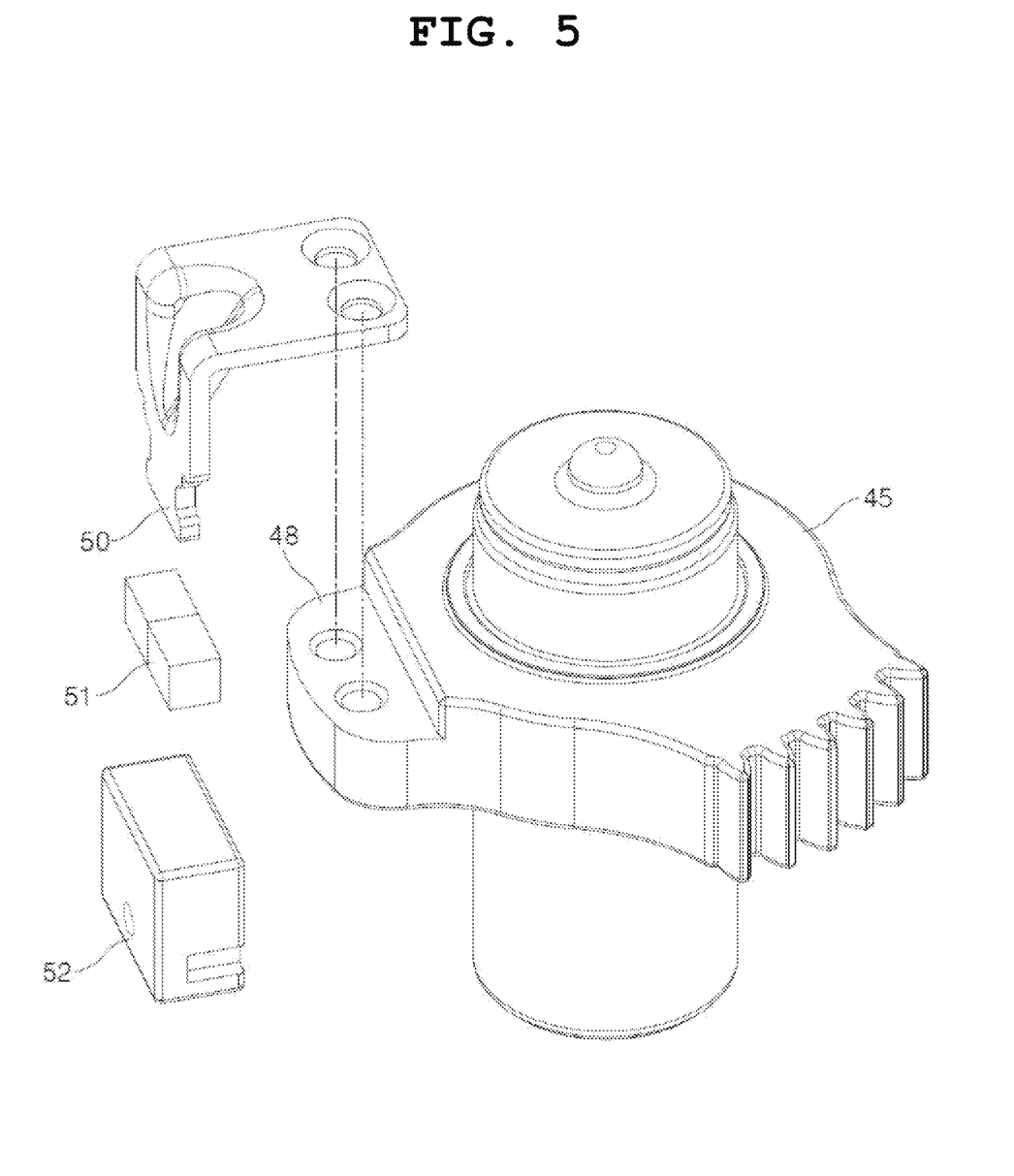
FIG. 5 is an exploded perspective view of the rotating shaft, the fixing bracket, a magnet, the molding part, and the Hall sensor.

FIG. 3 is a plan view of the drive motor 15, the reducer 20, the movable member 25, the guide unit 30, and the rotating shaft 45, FIG. 4 is a perspective view of the PCB 40, the rotating shaft 45, a fixing bracket 50, a molding part 52, and a Hall sensor 53, and FIG. 5 is an exploded perspective view of the rotating shaft 45, the fixing bracket 50, a magnet 51, the molding part 52, and the Hall sensor 53. Referring to FIGS. 3 to 5, the parking lock actuator 1 for a vehicle equipped with an electronic stopper for shock prevention according to the embodiment of the present invention further includes the rotating shaft 45, the fixing bracket 50, the magnet 51, the molding part 52, and the Hall sensor 53.

First, the rotating shaft 45 is gear-engaged with the movable member 25 and converts the linear movement of the movable member 25 into rotational movement.

Furthermore, the rotating shaft 45 may be rotated clockwise or counterclockwise within the range of reference angles preset by the movable member 25 when the movable member 25 moves in a straight line. In this case, the rotating shaft 45 is provided at the rear of the movable member 25.

Furthermore, the fixing bracket 50 is screwed to one side of the rear of the rotating shaft 45 and rotated by the rotating shaft 45. In this case, the fixing bracket 50 is formed in the shape of a flat plate bent at a right angle.

Furthermore, the magnet 51 is fixedly coupled to the lower end of the fixing bracket 50, is rotated by the fixing bracket 50, and generates magnetic force.

Furthermore, the molding part 52 is formed to surround the lower part of the fixing bracket 50 and the upper part of the magnet 51.

Furthermore, the Hall sensor 53 is provided on the top surface of the PCB 40 to face the magnet 51, and detects the magnetic force of the magnet 51 when the magnet 51 is rotated. In this case, a first sensor and a second sensor are embedded inside the Hall sensor 53 so that when one sensor fails, the other sensor can detect the magnetic force of the magnet 51.

Furthermore, when the magnetic force detected by the Hall sensor 53 is a preset reference magnetic force, the controller 41 controls the driving of the drive motor 15 to stop such that the linear movement of the movable member 25 can be stopped.

More specifically, when the movable member 25 moves in a straight line by a preset reference distance from the center of the guide shaft 36, the rotating shaft 45 and the magnet 51 fixedly coupled to one side of the rear of the rotating shaft 45 are rotated by a preset reference angle.

Furthermore, when the magnet 51 is rotated by the reference angle, the Hall sensor 53 detects the preset reference magnetic force from the magnet 51. In this case, the controller 41 controls the driving of the drive motor 15 to stop, thereby preventing the movable member 25 from moving linearly beyond the reference distance. Through this, it may be possible to prevent the movable member 25 from colliding with the first side wall 33 or second side wall 34 of the guide support body 31.

Meanwhile, a first gear 26 is formed at the rear of the movable member 25. Furthermore, an arcuate portion 46 is formed at the front of the rotating shaft 45 in a curved form.

Furthermore, a second gear 47 that is engaged with the first gear 26 and rotated by the first gear 26 is formed on the outside of the arcuate portion 46. In this case, the first and second gears 26 and 47 may each be implemented in the form of a spur gear.

Meanwhile, a fastening portion 48 is formed on one side of the rear of the rotating shaft 45. Furthermore, the fixing bracket 50 is screwed to the fastening portion 48 and rotated by the rotating shaft 45.

Referring to FIG. 2, a fixing portion 32 that is screwed to the reducer 20 is formed on one side of the guide support body 31. Furthermore, the first side wall 33 is formed on the other side of the fixing portion 32 to stop the movable member 25 from moving linearly in the left direction.

Furthermore, the second side wall 34 is formed on the other side of the guide support body 31 to stop the movable member 25 from moving linearly in the right direction. In this case, the second side wall 34 is formed to have the same shape and size as the first side wall 33.

Figure 6:
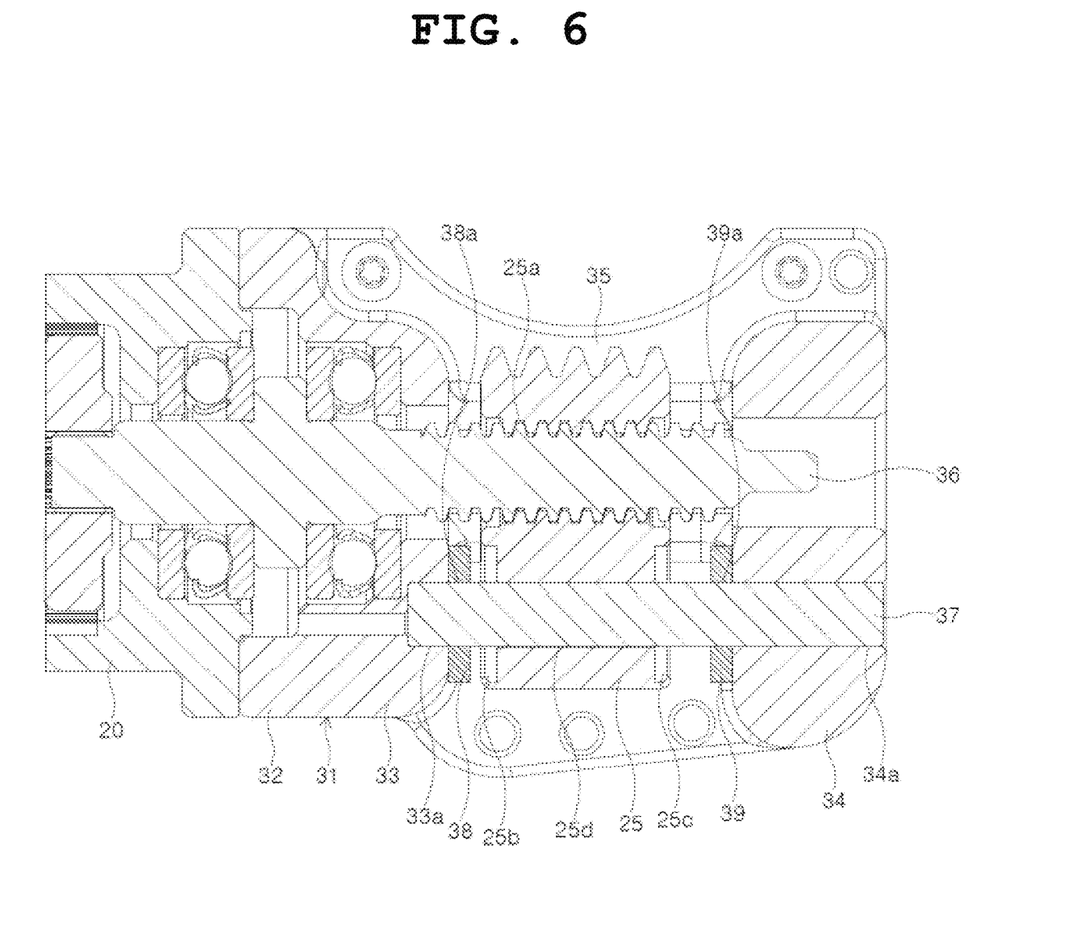
FIG. 6 is a sectional plan view of the reducer, the movable member, and the guide unit.

FIG. 6 is a sectional plan view of the reducer 20, the movable member 25, and the guide unit 30. Referring to FIG. 6, the guide unit 30 may further include a first stopper 38 and a second stopper 39.

First, the first stopper 38 is fixedly coupled to the other side of the first side wall 33 to prevent the movable member 25 from colliding with the first side wall 33. In this case, the first stopper 38 may be formed in the shape of a disk having a predetermined thickness. Furthermore, the first stopper 38 is made of coated carbon tool steel to absorb the impact force of the movable member 25 when it collides with the movable member 25, but may also be made of rubber or polyurethane.

Furthermore, the second stopper 39 is fixedly coupled to one side of the second side wall 34 to prevent the movable member 25 from colliding with the second side wall 34. In this case, the second stopper 39 is formed to have the same shape, size and material as the first stopper 38.

Meanwhile, a connecting portion 35 that is connected to the first and second side walls 33 and 34 is formed between the first and second side walls 33 and 34. In this case, the connecting portion 35 is formed in the left-right directions.

Furthermore, a receiving portion 35a is formed between the connecting portion 35, the first side wall 33, and the second side wall 34 to allow the movable member 25 to move in the left-right directions.

Furthermore, a first coupling hole 33a into which one end of the auxiliary shaft 37 is inserted and coupled is recessed into the other side of the first side wall 33. Furthermore, a second coupling hole 34a into which the other end of the auxiliary shaft 37 is inserted and coupled is formed through one side of the second side wall 34.

Referring to FIG. 6, a first recessed hole 25b into which the first stopper 38 is partially inserted when the movable member 25 moves to the left may be recessed into one side of the movable member 25. In this case, the first recessed hole 25b is formed in the shape of a disk.

Furthermore, a second recessed hole 25c into which the second stopper 39 is partially inserted when the movable member 25 moves to the right may be recessed into the other side of the movable member 25. In this case, the second recessed hole 25c is formed to have the same shape and size as the first recessed hole 25b.

Furthermore, a guide hole 25d through which the auxiliary shaft 37 is inserted may be formed through the inner surface of the first recessed hole 25b to communicate with the second recessed hole 25c.

Meanwhile, a first through hole 38a may be formed through the first stopper 38 so that one side of the auxiliary shaft 37 can be inserted therethrough. Furthermore, a second through hole 39a may be formed through the second stopper 39 so that the other side of the auxiliary shaft 37 can be inserted therethrough.

Figure 7:
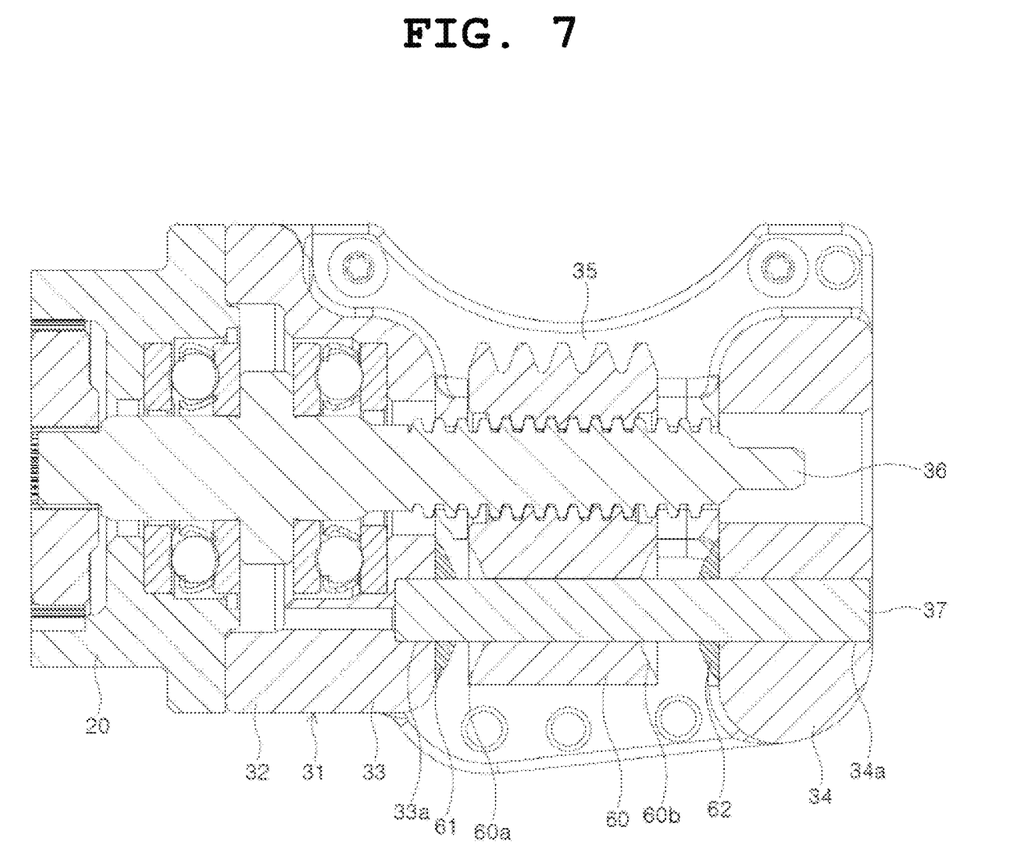
FIG. 7 is a sectional plan view of the reducer, the movable member and the guide unit equipped with a third stopper and a fourth stopper.

FIG. 7 is a sectional plan view of the reducer 20, the movable member 25 and the guide unit 30 equipped with a third stopper 61 and a fourth stopper 62. Referring to FIG. 7, the parking lock actuator 1 for a vehicle equipped with an electronic stopper for shock prevention according to an embodiment of the present invention further includes a movable unit 60. First, the movable unit 60 is provided on the other side of the reducer 20 and converts the rotational movement of the reducer 20 into linear movement.

Referring to FIG. 7, a third recessed hole 60a is formed on one side surface of the movable unit 60. In this case, the third recessed hole 60a is formed in a concave and curved shape.

Furthermore, a fourth recessed hole 60b may be recessed on the other side surface of the movable unit 60. In this case, the fourth recessed hole 60b is formed to have the same shape and size as the third recessed hole 60a.

Meanwhile, the guide unit 30 may further include a third stopper 61 and a fourth stopper 62.

First, the third stopper 61 is fixedly coupled to the other side of the first side wall 33, and is partially inserted into the third recessed hole 60a to prevent the movable unit 60 from colliding with the first side wall 33 when the movable unit 60 moves to the left. In this case, the third stopper 61 may be formed to have a convex and curved shape in order to alleviate impact force by increasing the contact area between the movable unit 60 and the third stopper 61 when colliding with the mobile unit 60.

Furthermore, the fourth stopper 62 is fixedly coupled to one side surface of the second side wall 34, and is partially inserted into the fourth recessed hole 60b to prevent the movable unit 60 from colliding with the second side wall 34 when the movable unit 60 moves in the right direction. In this case, the fourth stopper 62 is formed to have the same shape, size and material as the third stopper 61.

Figure 8:
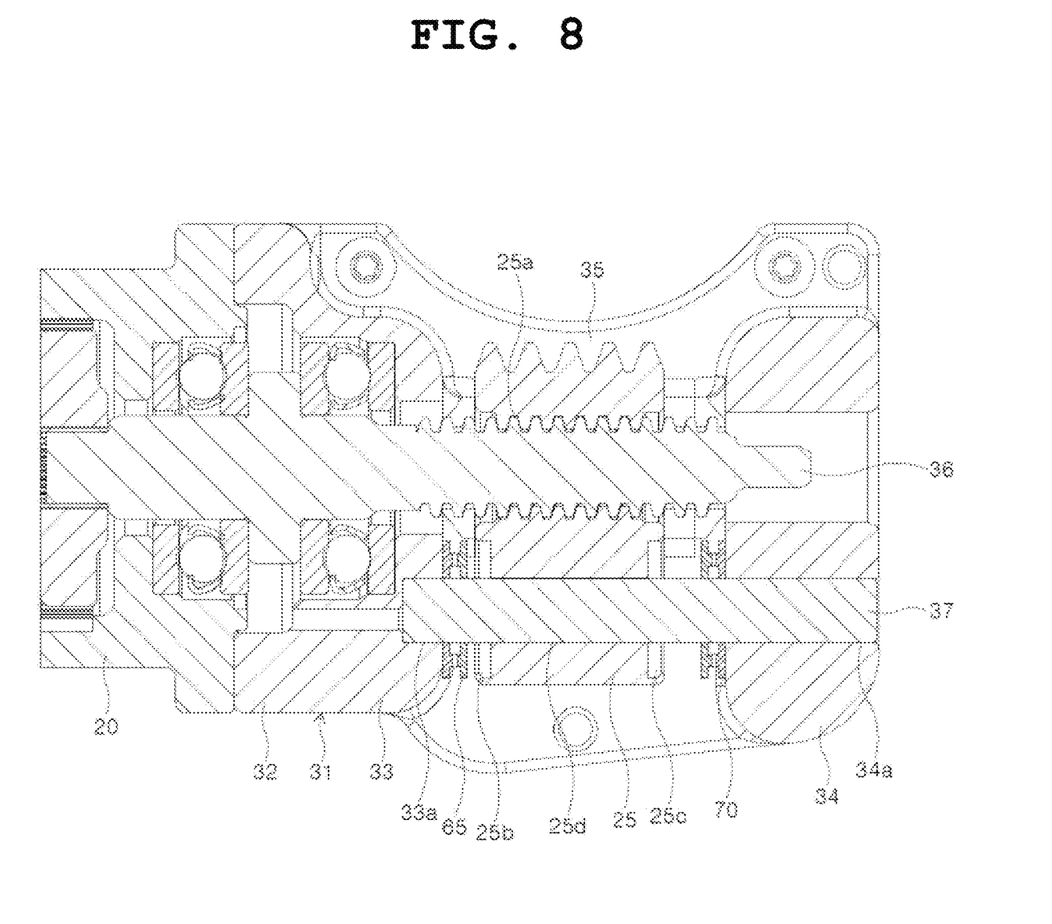
FIG. 8 is a sectional plan view of the reducer, the movable member and the guide unit equipped with a fifth stopper and a sixth stopper.

FIG. 8 is a sectional plan view of the reducer 20, the movable member 25 and the guide unit 30 equipped with a fifth stopper 65 and a sixth stopper 70. Referring to FIG. 8, the guide unit 30 may further include the fifth stopper 65 and the sixth stopper 70.

First, the fifth stopper 65 is fixedly coupled to the other side of the first side wall 33, and is partially inserted into the first recessed hole 25b to prevent the movable member 25 from colliding with the first side wall 33 when the movable member 25 moves to the left.

Furthermore, the sixth stopper 70 is fixedly coupled to one side of the second side wall 34, and is partially inserted into the second recessed hole 25c to prevent the movable member 25 from colliding with the second side wall 34 when the movable member 25 moves to the right. In this case, the sixth stopper 70 is formed to have the same shape, size and material as the fifth stopper 65.

Figure 9:
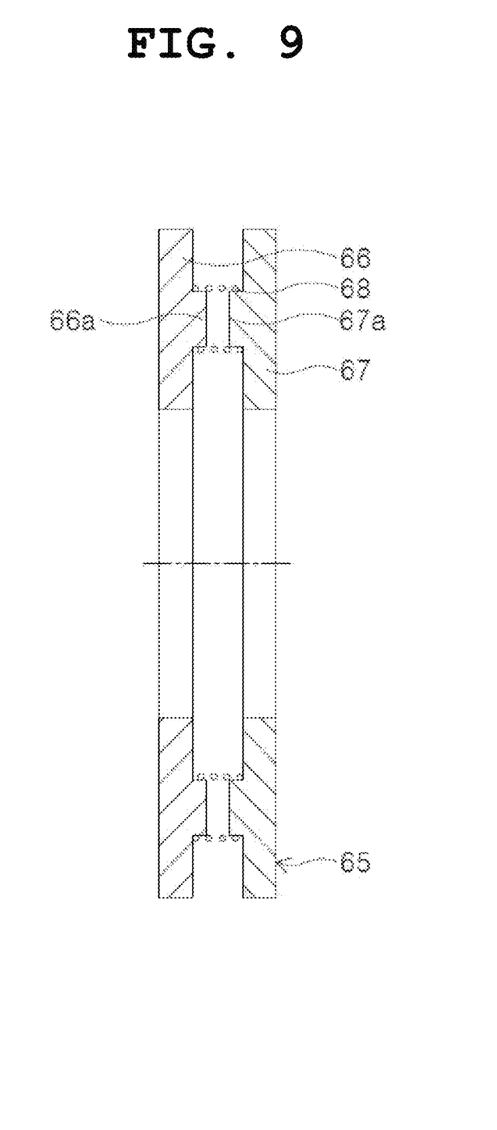
FIG. 9 is a sectional view of the fifth stopper shown in FIG. 8.

FIG. 9 is a sectional view of the fifth stopper 65 shown in FIG. 8. Referring to FIG. 9, the fifth stopper 65 includes a first elastic part 66, a second elastic part 67, and first springs 68.

First, the first elastic part 66 is fixedly coupled to the other side of the first side wall 33. In this case, the first elastic portion 66 is formed in the shape of a disk having a predetermined thickness. Furthermore, the first elastic part 66 is made of coated carbon tool steel to absorb the impact force of the movable member 25 when colliding with the movable member 25, but may be made of rubber or polyurethane material having elasticity.

Furthermore, the second elastic part 67 is provided on the other side of the first elastic part 66. In this case, the second elastic part 67 is formed to have the same shape, size and material as the first elastic part 66.

Furthermore, the plurality of first springs 68 are coupled between the first elastic part 66 and the second elastic part 67 and are formed to selectively contract and expand. In this case, the first springs 68 are formed in the shape of springs that can selectively contract and expand.

Meanwhile, a plurality of first protrusions 66a to which first ends of the first spring 68 are fastened are formed on the other side of the first elastic part 66. In this case, the plurality of first protrusions 66a are formed in the circumferential direction of the first elastic part 66.

Furthermore, a plurality of second protrusions 67a to which the second ends of the first springs 68 are fastened are formed on one side of the second elastic part 67. In this case, the plurality of second protrusions 67a are formed in the circumferential direction of the second elastic part 67.

Figure 10:
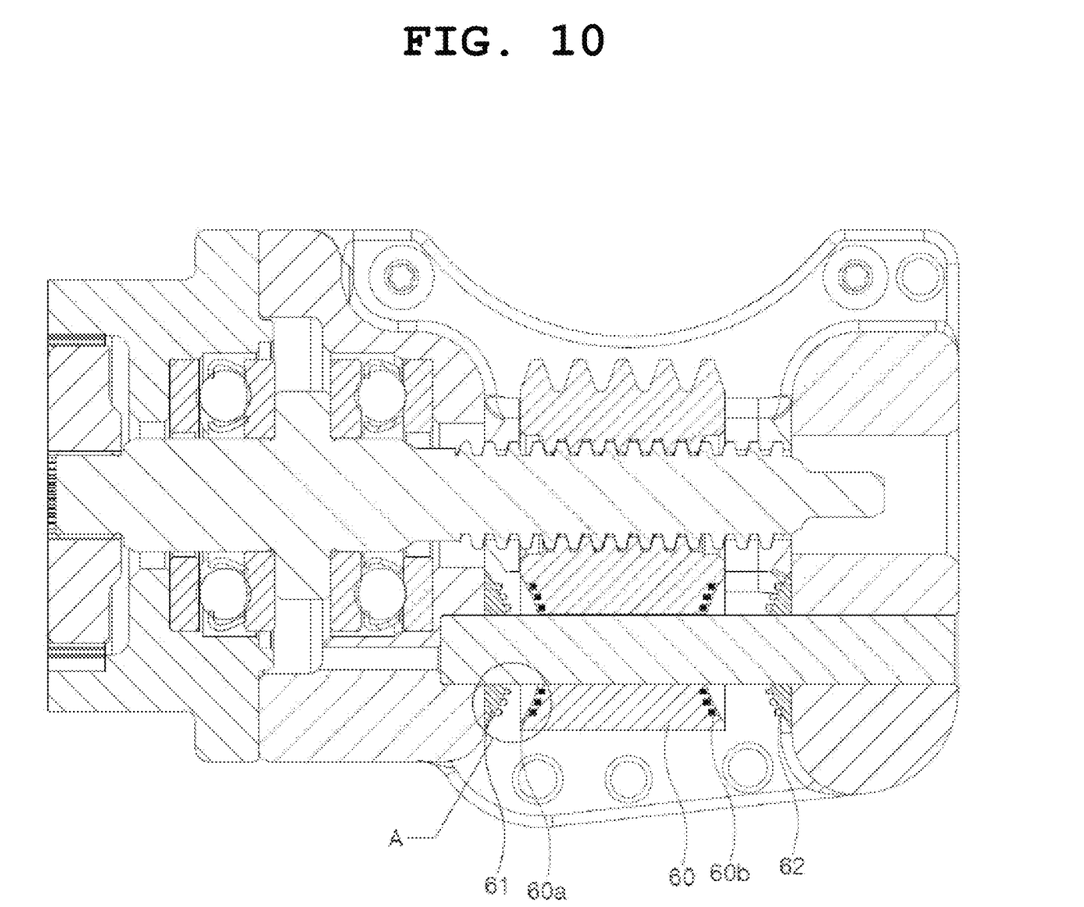
FIG. 10 is a sectional plan view of the reducer, the movable unit, and the guide unit provided with protruding members and a slide part.
Figure 11:
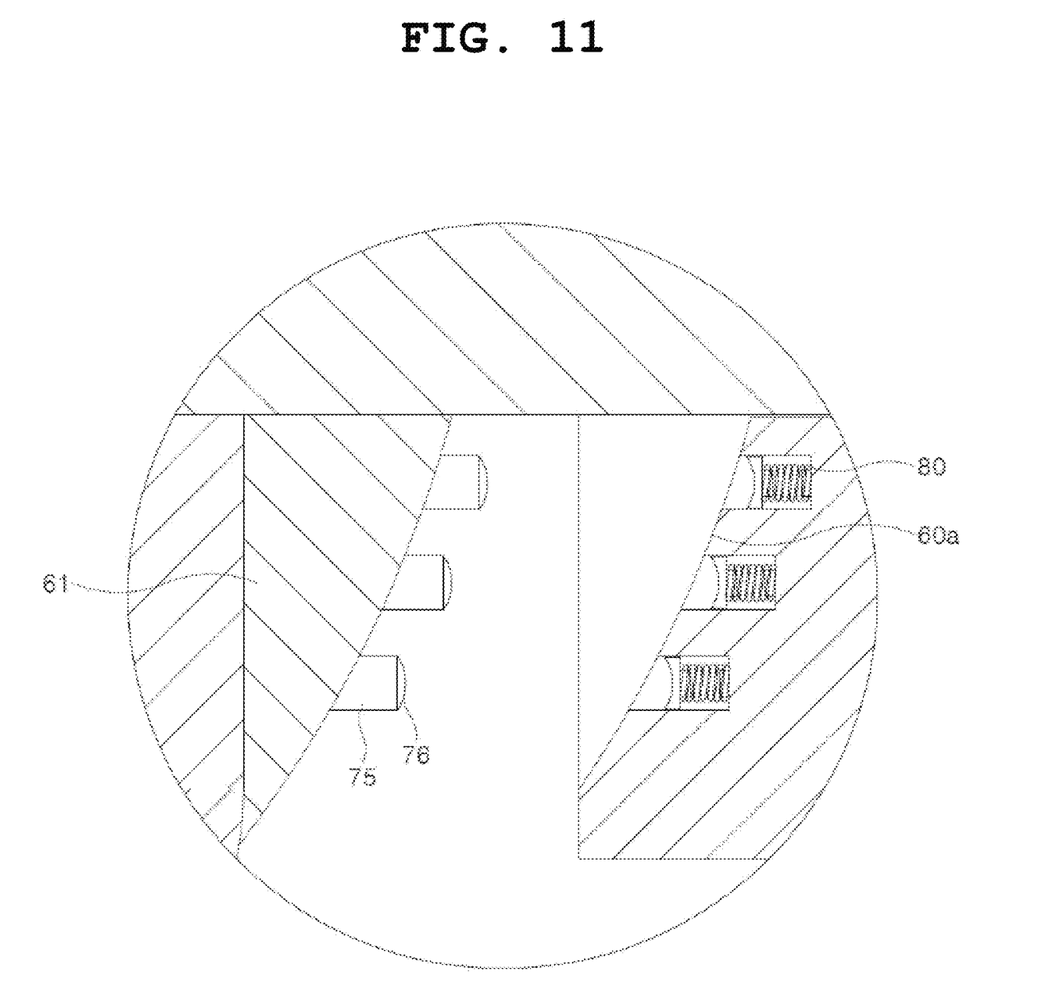
FIG. 11 is a detailed view of part "A" shown in FIG. 10.

FIG. 10 is a sectional plan view of the reducer 20, the movable unit 60, and the guide unit 30 provided with protruding members 75 and a slide part 81, and FIG. 11 is a detailed view of part "A" shown in FIG. 10. Referring to FIGS. 10 and 11, a plurality of protruding members 75 are formed to protrude on the other side of the third stopper 61.

In this case, the protruding members 75 are each formed in a cylindrical shape in the left-right directions and protrude to the right. Additionally, the protruding members 75 are made of elastic material that can selectively contract and expand. Furthermore, convex members 76 are formed to be convex to the right on the outsides of the protruding members 75.

Furthermore, a plurality of coupling holes 60c into which the protruding members 75 are inserted are recessed and formed on the inside of the third recessed hole 60a. In this case, the coupling holes 60c are recessed to the right. Furthermore, the cross sections of the coupling holes 60c are each formed in a circular shape.

Figure 12:
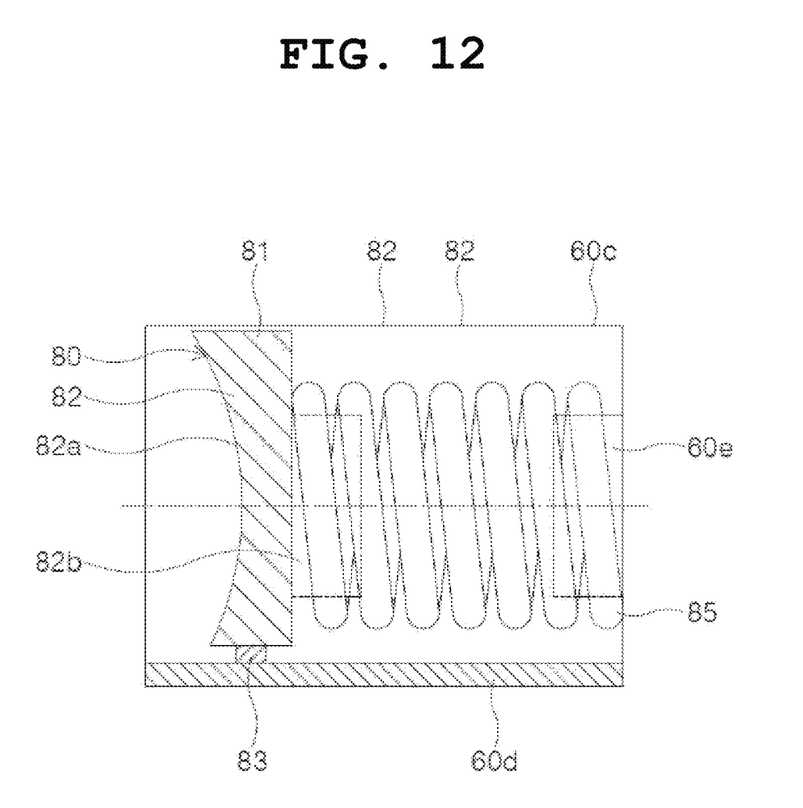
FIG. 12 is a front sectional view of the coupling hole and buffer member shown in FIG. 11.
Figure 13:
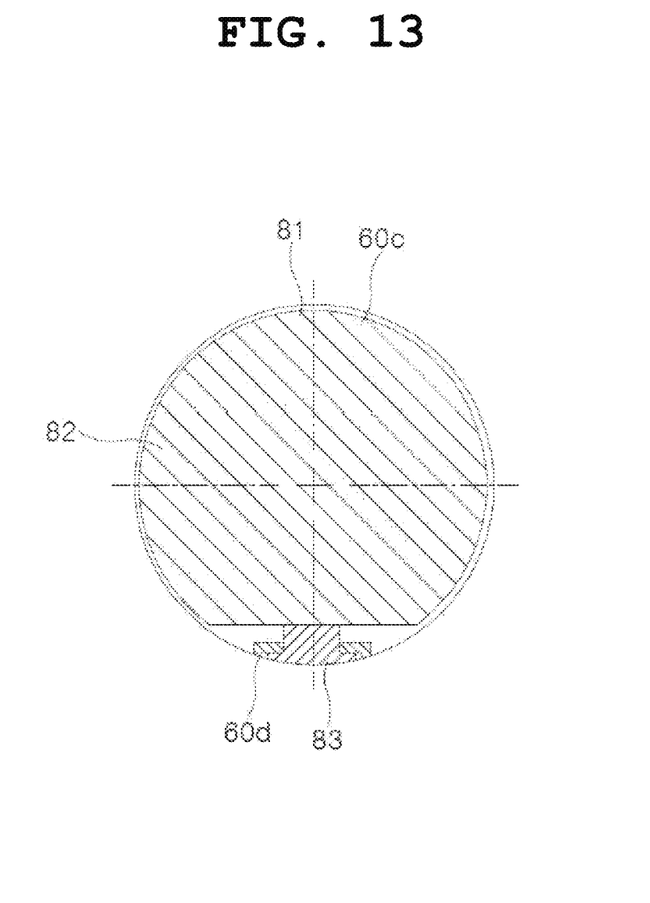
FIG. 13 is a side view of the coupling hole and buffer member shown in FIG. 12.

FIG. 12 is a front sectional view of the coupling hole 60c and buffer member 80 shown in FIG. 11, and FIG. 13 is a side view of the coupling hole 60c and buffer member 80 shown in FIG. 12. Referring to FIGS. 12 and 13, the present invention may further include the buffer member 80.

First, the buffer members 80 are provided in the inside of the third recessed hole 60a to face the protruding members 75, and serve to alleviate the impact force between the third stopper 61 and the third recessed hole 60a when the third stopper 61 and the third recessed hole 60a collide with each other.

Furthermore, a rail guide part 60d configured to guide the buffer member 80 through the left-right movement thereof is formed at the bottom of the inside of the coupling hole 60c. In this case, the rail guide part 60d is formed in the left-right directions.

Meanwhile, the buffer member 80 may include a slide part 81 and an elastic body 85.

First, the slide part 81 is installed to be movable in the left-right directions inside the third recessed hole 60a to alleviate the impact force between the third stopper 61 and the third recessed hole 60a when the third stopper 61 and the third recessed hole 60a collide with each other. In this time, the slide part 81 is moved in the left-right directions by the protruding member 75.

Furthermore, the elastic body 85 is installed inside the third recessed hole 60a, is provided on the other side of the slide part 81, and is selectively contracted and expanded by the slide part 81. In this case, the elastic body 85 is formed in the shape of a spring that can be selectively contracted and expanded.

Meanwhile, a contact member 82 is formed on the upper portion of the slide part 81. Furthermore, a concave portion 82a configured to come into surface contact with the convex member 76 in order to alleviate the impact force between the third stopper 61 and the third recessed hole 60a when the third stopper 61 and the third recessed hole 60a collide with each other is formed to be concave to the right on one side of the contact member 82. Furthermore, a guide rail 83 configured to move in the left-right directions along the rail guide part 60d is formed at the bottom of the contact member 82. Moreover, a stop member (not shown) may be provided on one side of the coupling hole 60c to prevent the guide rail 83 from being separated to the outside.

Furthermore, a first coupling member 82b into which one end of the elastic body 85 is inserted and coupled is formed to protrude on the other side of the contact member 82. In this case, the first coupling member 82b has a cylindrical shape and protrudes to the right.

Furthermore, a second coupling member 60e into which the other end of the elastic body 85 is inserted protrudes on the inner surface of the coupling hole. In this case, the second coupling member 60e has a cylindrical shape and protrudes to the left.

In the present invention, when the movable unit 60 moves in a straight line and collides with the side wall of the guide support body 31, the impact force between the movable unit 60 and the guide support body 31 may be alleviated through the pluralities of protruding members 75 and buffer members 80.

In the parking lock actuator 1 for a vehicle equipped with an electronic stopper for shock prevention according to an embodiment of the present invention, when the magnetic force of the magnet 51 detected by the Hall sensor 53 is equal to a reference value, the drive motor 15 that drives the movable member 25 and the rotating shaft 45 may be stopped using the magnet 51 rotated by the rotating shaft 45 and the Hall sensor 53 configured to detect the magnetic force of the magnet 51, so that there is the effect of preventing the movable member 25 from colliding with the side wall of the guide support body 31 in advance.

In the parking lock actuator 1 for a vehicle equipped with an electronic stopper for shock prevention according to an embodiment of the present invention, when the movable member 25 moves in a straight line and approaches the side wall of the guide support body 31, the movable member 25 is prevented from colliding with the side wall through the stopper that is fixedly coupled to the side wall and has elastic force in advance, so that there is the effect of improving the stability of the vehicle when switching the vehicle to a parking state or a driving state.

In the parking lock actuator 1 for a vehicle equipped with an electronic stopper for shock prevention according to an embodiment of the present invention, it may be possible to prevent the movable member 25 from colliding with the guide support body 31 in advance, so that there is the effect of dramatically increasing the durability and lifespan of the parking lock actuator.

As described above, the main technical spirit of the present invention is to provide the parking lock actuator 1 for a vehicle equipped with an electronic stopper for shock prevention, the embodiment described above with reference to the accompanying drawings is merely one embodiment, and the true scope of rights of the present invention is based on the attached patent claims, but also extends to equivalent embodiments that may be present in various forms.

What is claimed is:

1. A parking lock actuator for a vehicle equipped with an electronic stopper for shock prevention, including a drive motor, a reducer configured to reduce output speed of the drive motor, a movable member configured to convert rotational movement of the reducer into linear movement, and a guide unit configured to guide the movable member through linear movement thereof, the parking lock actuator comprising:

a printed circuit board provided with a controller to control driving of the drive motor;

a rotating shaft gear-engaged with the movable member, and configured to convert linear movement of the movable member into rotational movement;

a fixing bracket screwed to one side of a rear of the rotating shaft, and configured to be rotated by the rotating shaft;

a magnet fixedly coupled to a lower end of the fixing bracket, and configured to be rotated by the fixing bracket and generate magnetic force; and a Hall sensor provided on a top surface of the printed circuit board to face the magnet, and configured to detect magnetic force of the magnet when the magnet is rotated;

wherein the controller, when the magnetic force detected by the Hall sensor is a preset reference magnetic force, controls the drive motor to stop such that linear movement of the movable member can be stopped.

2. The parking lock actuator of claim 1, wherein the guide unit comprises a guide support body screwed to one side of the reducer, and a guide shaft formed to pass through the guide support body, axially coupled to the reducer, and configured to be rotated by the reducer, wherein the movable member is screwed to the guide shaft, and is moved linearly in left-right directions by the guide shaft when the guide shaft is rotated, wherein a fixing portion that is screwed to the reducer is formed on one side of the guide support body, wherein a first side wall is formed on one side of the fixing portion to stop the movable member from moving linearly in a left direction, wherein a second side wall is formed on an opposite side of the guide support body to stop the movable member from moving linearly in a right direction, and wherein the guide unit comprises a first stopper fixedly coupled to one side of the first side wall to prevent the movable member from colliding with the first side wall, and a second stopper fixedly coupled to one side of the second side wall to prevent the movable member from colliding with the second side wall.

3. The parking lock actuator of claim 2, wherein the first and second stoppers are each formed in a disk shape having a predetermined thickness, and wherein the first and second stoppers are each made of any one of coated carbon tool steel, rubber, and polyurethane to absorb impact force of the movable member when it collides with the movable member.

4. The parking lock actuator of claim 3, wherein a first recessed hole into which the first stopper is partially inserted when the movable member moves in a left direction is recessed into one side of the movable member, and wherein a second recessed hole into which the second stopper is partially inserted when the movable member moves in a right direction is recessed into an opposite side of the movable member.

5. The parking lock actuator of claim 2, wherein the guide unit further comprises an auxiliary shaft disposed in front of the guide shaft and in parallel to the guide shaft and configured to guide the movable member so that the movable member can move linearly in left-right directions without rotating, wherein a first through hole is formed through the first stopper so that one side of the auxiliary shaft can be inserted therethrough, and wherein a second through hole is formed through the second stopper so that an opposite side of the auxiliary shaft can be inserted therethrough.

6. The parking lock actuator of claim 1, further comprising a movable unit provided on one side of the reducer and configured to convert rotational movement of the reducer into linear movement, wherein a third recessed hole having a concave and curved shape is formed on one side of the movable unit, wherein a fourth recessed hole having a concave and curved shape is formed on an opposite side of the movable unit, wherein the guide unit further comprises:

a third stopper fixedly coupled to one side of a first side wall, and configured to be partially inserted into the third recessed hole to prevent the movable unit from colliding with the first side wall; and a fourth stopper fixedly coupled to one side of a second side wall, and configured to be partially inserted into the fourth recessed hole to prevent the movable unit from colliding with the second side wall, wherein the third stopper is formed in a convex and curved shape, and wherein the fourth stopper is formed in a convex and curved shape.

* * * * *